Figure 1:
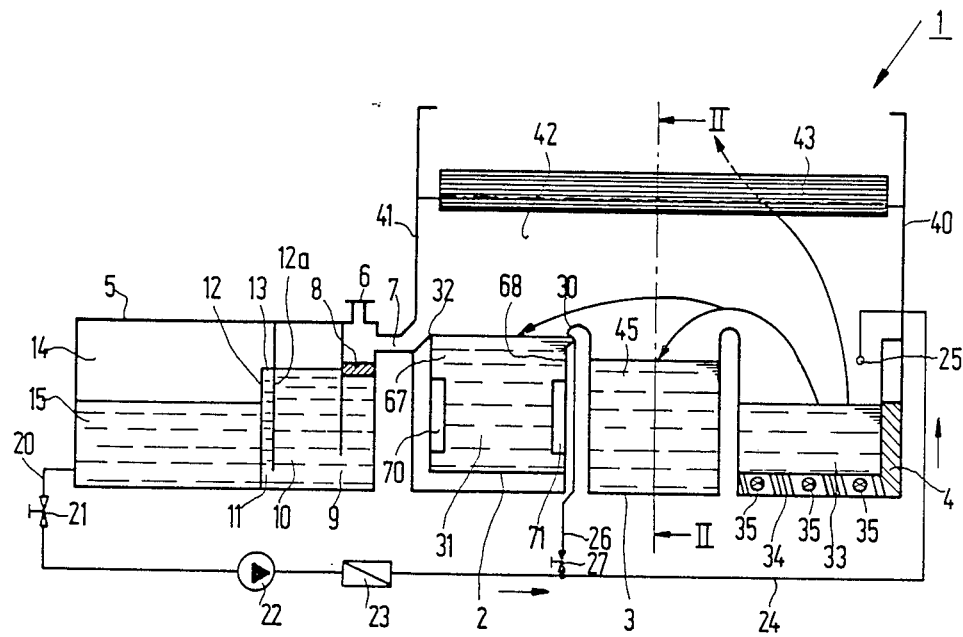

United States Patent [19]

Koop et al.

[11] Patent Number: 4,745,690

[45] Date of Patent: May 24, 1988

[54] METHOD OF REPLENISHING AND/OR PREPARING TREATING LIQUIDS

[75] Inventors: Hermann Koop, Ronnenberg; Friedrich-Wilhelm A. Thein, Wunstorf, both of Fed. Rep. of Germany

[73] Assignee: Polygram International Holding B.V., Baarn, Netherlands

[21] Appl. No.: 2,079

[22] Filed: Jan. 12, 1987

[30] Foreign Application Priority Data

Jan. 14, 1986 [DE] Fed. Rep. of Germany ....... 3600778

[51] Int. Cl.⁴ .............................................. F26B 5/16
[52] U.S. Cl. .......................................... 34/9; 34/27; 34/32; 34/78
[58] Field of Search .................... 34/9, 75, 78, 60, 27, 34/32

[56] References Cited

U.S. PATENT DOCUMENTS 3,559,297 2/1971 Figiel ....................................... 34/9

Primary Examiner—Larry I. Schwartz
Attorney, Agent, or Firm—Norman N. Spain

[57] ABSTRACT

The invention relates to a method of replenishing and/or preparing water-displacing treating liquids or mixtures of these treating liquids and of water-absorbing liquids. Said liquids are contained in treating compartments and are used to remove water which adheres to the surface of objects immersed in the treating liquids. The objects may consist of, for example, glass, ceramic, nickel, copper, stainless steel or synthetic resin such as, for example, disc-shaped information carriers.

12 Claims, 1 Drawing Sheet

METHOD OF REPLENISHING AND/OR PREPARING TREATING LIQUIDS

BACKGROUND OF THE INVENTION

The invention relates to a method of replenishing and/or providing water-displacing treating liquids or mixtures of these treating liquids and of water-absorbing liquids in treating compartments, which liquids are used to remove water from the surfaces of objects to be immersed in the treating liquids, said objects being made of glass, ceramic, nickel, copper, stainless steel or synthetic resin such as, for example, disc-shaped information carriers.

In the art there is a need for methods of removing liquids from objects whose surfaces are contaminated by said liquids. In the case of, for example, optically-readable disc-shaped information carriers such as, compact-discs the water used to clean them must be removed after the cleaning process. The same applies to silicon discs and copper and glass components which are used in electric circuits. When such objects are dried it is important that no deposition residues are left behind on their surfaces in the form of drying spots. Moreover, to avoid mechanical attack of the objects to be dried, it is to be noted that in the drying process certain predetermined temperatures are not to be exceeded. When drying, for example, disc-shaped information carriers such as, for example, compact discs, a temperature of 90° C. must not be exceeded. A further important factor in drying is that the objects to be dried are not contaminated by particles which are suspended in the treating liquid. Consequently, high-grade, i.e. highly pure, treating liquids must be used.

DE-OS No. 23 01 357 describes a method and an arrangement for removing liquids from solid surfaces, according to which method an object having a surface which is contaminated by a liquid is immersed in a solvent-containing bath, the density of the solvent being different from that of the liquid. The solvent is agitated, thereby removing the liquid from the object. The liquid and the solvent are discharged from the bath and after the solvent has been separated from the liquid it is fed back to the solvent-containing bath. This method requires a very pure solvent which is very expensive. Moreover, when high demands are imposed upon the purity of the solvent it must be refreshed very frequently, thereby rendering uneconomical this method of removing liquids.

DE-OS No. 31 25 980 describes a method of manufacturing carriers having a high information density, in which surface impurities are first removed by an aqueous rinsing agent which is subsequently removed by rinsing the carriers with a liquid fluorocarbon. Next, the carrier is maintained in a fluorocarbon vapour until the carrier temperature equals the vapour temperature. Also in this method the liquid fluorocarbon must be very pure, and as it is contaminated in the disc-rinsing process it must be frequently refreshed.

It is an object of the invention to provide a method of replenishing and/or providing water-displacing or water-absorbing treating liquids, which allows for an efficient use of solvents so that the preparing and replenishing of absolutely pure treating liquids can be dispensed with.

This object is achieved according to the invention, by a method in which the surfaces of the treating liquids in the compartments are kept at such a temperature that a similar, vaporized treating liquid which is provided over these surfaces condenses on those surfaces.

Such a method of replenishing and/or providing water-displacing or water-absorbing treating liquids or mixtures thereof has the advantage that the treating liquids present in the liquid phase in treating compartments can be replenished continuously with a similar liquid which is provided in the vapor phase and which condenses on the surfaces of the liquid phase treating liquids in the treating compartments.

As the treating liquids are first vaporized and are not used as a treating liquid until they have condensed, an inevitable purification of the treating liquids takes place because due to the vaporization they cannot entrain the solid contaminations. This is advantageous, both in filling the treating compartments, i.e. when they are filled for the first time, and in the continuous regeneration of the liquids in the treating compartments. In order to continuously regenerate the treating liquids in the treating compartments, these liquids are discharged from the treating compartments, vaporized and condensed again on the surfaces of the liquid in these compartments. In this way the treating liquids are continuously subjected to a process in which they are vaporized and, thus, purified and cleared of water. Thus, this method is economically feasible and, moreover, provides a highly pure treating liquid.

This method can be applied to water-displacing treating liquids, mixtures thereof and water-absorbing liquids.

The selection of the temperatures of the treating liquids in the treating compartments depends on the composition of these liquids and on the material and properties of the objects to be treated. In any case, the temperature of the treating liquids in the compartments must be kept below the vaporization temperature of the liquids if a vaporized similar treating liquid which is situated above the surfaces of the treating liquids is to condense on these surfaces.

In accordance with a further embodiment of the inventive method, the vaporous treating liquid which condenses on these surfaces is vaporized by heating in a vaporization compartment.

In a vaporization compartment the treating liquids can readily be vaporized by heating. Consequently, both treating liquids which are discharged from the treating compartments and fresh, unused treating liquids can be supplied to said vaporization compartment. The vaporization compartment must be arranged so that the vaporized treating liquid is supplied to the surfaces of the treating liquids in the treating compartments where the vapour will then condense.

According to a further embodiment of the inventive method, a mixture of a fluorocarbon and an alcohol is used as a treating liquid. An exmple of a suitable fluorocarbon is 1,1,2-trichloro-1,1,2-trifluoro-ethane.

If water is to be removed from the surfaces of the objects to be treated, a liquid fluorocarbon is a suitable treating liquid because its specific gravity is higher than that of water and it removes the water from the surfaces of the objects to be treated. When the alcohol is added to the fluorocarbon, the removal of moisture from the surfaces of the objects to be treated is facilitated because alcohol absorbs water. Suitable alcohols are, for example, isopropanol, methanol, ethanol and butanol.

According to a further embodiment of the method of the invention, the mixture of the fluorocarbon and alcohol in the treating compartments is kept at a temperature which is from 7° C. to 15° C. below the boiling point of the mixture.

Advantageously, this temperature range is observed because on the one hand the temperature of the water in the ambient air does not fall below the dew point, and thus the formation of a water film on the liquid mixture in the treating compartments is avoided, and on the other the temperature is seleted so that the vaporized treating liquid above the compartments condenses on the fluid treating liquids in the compartments. Moreover, in order to ensure an adequate replacement of the treating liquid in the compartments, the temperature of the treating liquids in the treating compartments must be selected so that a sufficient quantity of the vaporized treating liquid condenses on the surfaces.

According to a further embodiment of the invention, the alcohol concentration of the liquid fluorocarbon-alcohol mixture in the vaporization compartment, which mixture is to be vaporized by applying heat, is such that the vaporous treating liquids and the treating liquids which are in the treating compartments are azeotropic or of a similar composition. In order to ensure that the mixture in the treating compartments is azeotropic, the alcohol concentration in the vaporization compartment must at least be sufficient so that the mixture is azeotropic. An upper limit is set to the alcohol concentration in the vaporization compartment by the fact that the fluorocarbon-alcohol mixture should be free of inflammable vapors. Thus, the alcohol concentration generally lies between 1.5 and 15% by weight.

According to a further embodiment of the invention, water and/or water-contaminated treating liquid are/is led from the surfaces of the treating liquid in the treating compartments to at least one water separator by means of overflow devices, after which they/it are/is supplied to a storage tank, from where they/it are/is pumped through a filter and vaporized in the vaporization compartment.

As the water or the water-contaminated treating liquid has a lower specific gravity than the uncontaminated treating liquid, the water or the water-contaminated treating liquid accumulates at the surface of the liquids in the treating compartments. Subsequently, overflow devices supply the water to a known water separator which operates according to the principle of gravity. The treating liquid is then led into a storage tank which is designed so that the treating liquid used in the process does not have to be replaced continuously but rather at irregular intervals. From the storage tank the treating liquid is pumped through a filter in which it is purified mechanically. After filtering the liquid flows into an arrangement in which it is vaporized again.

According to a further embodiment of the invention, the vaporized treating liquid is also used for rinsing the condensate off an object which is pulled out of a treating liquid in treating compartment.

As the temperature of the fluid treating liquid in the treating compartments is below the vaporization temperature, the vaporized treating liquid can also be used for rinsing a condensate. If an object is pulled out of the treating liquid in the treating compartment after it has been immersed therein for a sufficiently long time, its temperature will be substantially equal to that of the fluid treating liquid, i.e. a temperature below the vaporization temperature. Consequently, after the object has been pulled out the vaporized treating liquid will deposit as a condensate on the surface of the object and rinse it. Thus, the vaporous treating liquid is used twice, namely on the one hand to replenish the liquids in the treating compartments and on the other to rinse the condensate off the objects which are pulled out of the liquids in the compartments.

According to a further embodiment of the invention, the vaporized treating liquid is contained in a bounded space in the upper part of which there is a cold trap from where the condensed, water-contaminated treating liquid is led to a water separator and subsequently passed on to a treating compartment.

The space above the treating compartment, in which vaporized treating liquids are present, is essentially closed, although it must have an aperture to enable objects to be supplied to or withdrawn from said space. To separate said aperture from the vapour present in the space, a cold trap is provided in the vicinity of the aperture, on which both the vapour of the treating liquid and the water vapour condense. The treating liquid is separated from the condensed water in a water separator. The treating liquid is then again supplied directly to the treating compartments or to the storage compartment.

According to a further embodiment of the inventive method, the treating liquid is cooled in the water separator(s), thereby obtaining the desired temperatures of the treating liquids in the treating compartments. The cooling of the treating liquids has the additional advantage that the water can be separated more readily.

Figure 2:
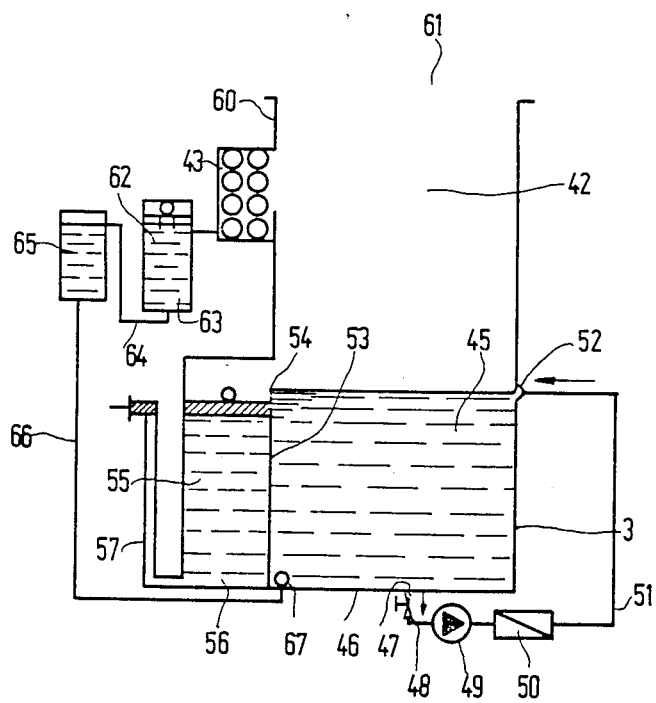

An exemplary embodiment of the invention will now be explained in more detail with reference to the drawings, in which FIG. 1 is a sectional view of a drying arrangement which operates according to the inventive method, FIG. 2 is a sectional view along the line II—II of the arrangement according to FIG. 1.

In FIG. 1 an arrangement for drying disc-shaped information carriers (compact discs) is shown in section, which operates according to the method of refilling and/or providing water-displacing treating liquids in treating components.

As shown in FIG. 1 in the arrangement 1 a first treating compartment 2 and a second treating compartment 3 are arranged next to one another. A vaporization compartment 4 is arranged next to the second treating compartment 3. A storage tank 5 is arranged next to the first treating compartment 2. The storage tank 5 includes a filling tube 6 and an inlet tube 7. The filling tube 6 and the inlet tube 7 lead to a water separator 8 which is arranged in the storage tank 5. The water separator 8 operates according to the principle of gravity, i.e. as the water is lighter than the treating liquid it will deposit on top of this liquid after which it is carried away in a way not shown in the drawing. Treating liquid which is cleared of water is led away from the water separator through an aperture 9, which is arranged at the bottom of the storage tank, and is then supplied to a further water separator 10. Via an aperture 11 in the water separator 10, treating liquid flows between partitions 12 and 12a and via a discharge aperture 13 into a storage compartment 14. In the storage compartment 14 there is a water-cleared treating liquid 15. A pipe 20 is arranged in the lower part of the storage compartment 14, by means of which treating liquid is discharged from the storage compartment. In the pipe 20 the treating liquid is first led through a flow control element 21 by means of which the rate of flow can be controlled. Next, the treating liquid is pumped through a filter 23 by a pump 22. The filter 23 is a mechanical one and it is used to retain any solid particles still present in the treating liquid. Behind the filter 23 a pipe 24 leads to a discharge aperture 25 which is provided above the vaporization compartment 4, so that treating liquids emanating from the aperture 25 flow into the vaporization compartment 4. A further pipe 26 having a flow control element 27 for controlling the rate of flow extends from the filter 23 to an overflow arrangement 30. The overflow arrangement 30 is arranged in the upper part of the treating compartment 2, such that it is in the vicinity of the surface of a fluid treating liquid 31 in the treating compartment 2. The overflow arrangement 30 operates as follows: the liquid pumped into the overflow arrangement 30 via the pipe 23 is driven over the surface of the treating liquid 31 in the compartment 2, so that the water or water-contaminated treating liquid present on the surface of the treating liquid flows over an overflow edge 32 at the other side of the treating compartment 2 into the inlet tube 7 of the storage tank 5 from where it flows into the water separator 8. The flow control element 27 in the pipe 26 can be adjusted so that as much as possible of the water supplied to the surface of the treating liquid in the treating compartment 2 by the overflow arrangement so as to be led into the storage tank 5 via the overflow edge 32.

By means of a pump 22 the treating liquid is led through the pipe 24 and the discharge aperture 25 into the vaporization compartment 4, in a lower part of which it accumulates. Heating tubes 35 are provided below the bottom 34 of the vaporization compartment, which tubes are used to indirectly heat the fluid treating liquid in the treating compartment until it vaporizes. The heating tubes 35 may be of different construction; the heating capacity must however be such that the treating liquid in the treating compartment 4 is vaporized. Above the treating compartments 2 and 3 and the vaporization compartment 4, which are arranged next to each other, there is a space 42 which is bounded at the sides by walls 40 and 41. At the top, the space 42 is bounded by a cold trap 43.

FIG. 2 is a sectional view along the line II—II of the treating compartment 3, the space 42 and the cold trap 43. A treating liquid 45 in the treating compartment 3 is led through an aperture 47 in the bottom part 46 of the compartment and through a flow control element 48 after which it is pumped through a filter 50 by means of a pump 49. The filter has the same function as the filter 23, namely the removal of solid particles. Behind said filter 50 the treating liquid is led to an overflow device 52 by a pipe 51. The overflow device operates in the same way as the overflow device 30 of the treating compartment 2. The contaminated treating liquid which is pumped over the surface by means of the overflow device 52 is supplied to a water separator 55 via an overflow edge 54, the separator being located on the other side 53 of the compartment, opposite the outflow arrangement. The water separator 55 operates in the same way as the water separator 8 of the storage tank 5. Treating liquid which is cleared of water is supplied (in a manner not shown) from the bottom 56 of the water separator 55 to the vaporization compartment 4 of FIG. 1 via a pipe 57. The aqueous phase of the treating liquid which is separated in the water separator is supplied to the water separator 8.

The expansion of the vapour of a treating liquid present in the space 42 is bounded at the upper side by a cold trap 43 which is arranged at the side 60 of an upper aperture 62 in said space 42. The vapour or water vapour condensing in the cold trap 43 is supplied to a water separator 62 which in accordance with the water separators 56 and 8 operates according to the principle of gravity. A treating liquid which is cleared of water and which is discharged from the bottom 63 of the water separator 62 is supplied to a tank 65 via a pipe 64. The tank 65 is used for intermediate storage. The fluid treating liquid in the tank 65 is discharged via the bottom of the tank and led through a pipe 66 to a treating compartment 3. Via an aperture 67 in the bottom of treating compartment 3 the treating liquid is introduced into said treating compartment where it is added to the treating liquid 45 already present.

The arrangement shown in FIGS. 1 and 2 operates according to the method of replenishing and/or preparing treating liquids as will be described below. The treating liquid which is vaporized in the vaporization compartment 4 accumulates in the space 42 above the treating compartments 2 and 3 and vaporization compartment 4. The cold trap forms the upper boundary of the vapour in said space 42. The fluid treating liquids 31 and 45 in the treating compartments 2 and 3 exhibit a temperature which is below their vaporization point. Consequently, the vapour of the same liquid, which is present above the compartments 2 and 3, condenses on the surfaces of the fluid treating liquids 31 and 45 in the compartments 2 and 3. By means of the overflow devices 30 and 52 the surfaces of the liquids in the compartments 2 and 3, respectively, are cleared of water or water-contaminated treating liquid which enters the compartments through the objects immersed therein. The treating liquid which is cleared of water in the water separator 52 is supplied to the vaporization compartment 4 and the separated aqueous phase is supplied to the water separator 8. The treating liquid which is carried away by the overflow device 30 and which is cleared of water is led to the storage tank 5. Subsequently, the treating liquid is again supplied to the overflow device 30 or to the vaporization compartment 4 where the treating liquid is vaporized again, after which it condenses on the surfaces of the treating liquids 31 and 45 in the compartments 2 and 3.

In this way the treating liquid is subjected to a cyclic process in which the treating liquid is vaporized time and again in the vaporization compartment 4 after which it condenses on the surface of the fluid treating liquid 31 or 45. Consequently, the treating liquid is vaporized time after time and, thus, purified. By this process, both the treating liquid which is to be replenished and the fresh treating liquid which is introduced via the tube 6 of the storage tank 5 are purified in the same way, because they are led to the vaporization compartment 4 where they are vaporized via the storage tank and the filter 23. The treating liquid does not contact the objects to be dried until it has condensed again. Even when high demands are put on the purity of the treating liquid in the compartments 2 and 3, the treating liquid used to fill the arrangement for the first time does not have to meet these requirements. In this case, the arrangement is filled with the treating liquid and is operated in an idle condition, i.e. a condition in which the vapour which is vaporized in the vaporization compartment 4 condenses on the surfaces of the treating liquids 31 and 35 in the treating compartments 2 and 3, until the treating liquid in the compartments 2 and 3 have been sufficiently purified. Moreover, although the treating liquid is contaminated over and again by immersed objects when the arrangement is in operation, it has to be refreshed relatively rarely because it is purified over and again by the cyclic conversion into the vapor phase.

A mixture of fluorocarbon and isopropanol has proved to be a suitable treating liquid. Although the alcohol concentration of the fluid mixture in the compartment 4 is of secondary importance, it must be selected so that the vapor of the mixture and the condensed mixture in the compartments 2 and 3 are azeotropic. Experience has shown that an azeotropic concentration of the mixture is sufficient to dry objects in the compartments 2 and 3. To dry the objects they are first immersed in the fluid treating liquid 31 in the compartment 2. After the objects have been immersed in the liquid, a large part of the water adhering to the objects rises to the surface where an overflow device 30 feeds the water via the overflow 32 to the water separator 8 in the storage tank 5. The water rises to the surface of the treating mixture 31 in the compartment, because the latter has a higher specific gravity than water. Furthermore, the alcohol contained in the mixture absorbs any water residue still adhering to the objects, and owing to the smaller specific gravity of water in comparison with the treating liquid the former rises to the surface where it is discharged by an overflow device 30 via an overflow 32. In order to remove any moisture still adhering to the objects, ultrasonic generators 70 and 71 may be arranged on two opposed sides 67 and 68 of the treating compartment 2, which generators are not put into operation until the greater part of the water has reached the surface and has been removed by an overflow device 30. After the ultrasonic generator has been put into operation some more water or residual moisture becomes detached from the objects due to the turbulence of the treating liquid, and is also removed from the surface of the treating liquid. After as much as possible of said residual moisture has been removed from the surfaces of the objects not shown in the drawing, the object is lifted from the treating compartment 2 and is led into the space 42 which is filled with vapour of the treating liquid. As the object has substantially adopted the temperature of the fluid treating liquid in the treating compartment 2, its temperature is at least several degrees below that of the vapour of the treating liquid in the space 42. Consequently, this vapour condenses on the surfaces of the object. In this way, the object is again rinsed with the treating liquid. Subsequently, the object is immersed in the treating liquid 45 in the second treating compartment 3. In the treating compartment 3, the object is cleared of any residual water in the same way as in compartment 2, yet more thoroughly because treating compartment 3 only contains objects with very little residual moisture, consequently, the fluid treating liquid 45 in the treating compartment 3 is only slightly contaminated by water. After the object is introduced into the treating liquid 45 in the treating compartment 3 and is cleared of any remaining residual moisture, it is pulled out of the fluid and led into the space 42. As the temperature of the fluid treating mixture 45 in the compartment 3 is at least a few degrees below that of the vapor of the mixture in space 42, said vapor condenses on the surface of the object when the object is lifted from the compartment 3. In this way the condensate is rinsed again. Subsequently, the object is slowly moved upward in the space 42. In this process, the object is heated until it has almost attained the temperature of the vapor and hardly any vapour condenses on its surfaces. The object is slowly dried and is carried past the cold trap 43 through the aperture 61 into the ambient air. In this way the object is dried so that it is free from any residue, i.e. without any drying spots. The retention time of the object to be dried in the treating compartments or in the vapour depends upon the temperatures selected and on the heat capacity of the object. The retention time is longer as the heat capacity of the object is higher.

What is claimed is:

1. A method of replenishing and/or providing water-displacing treating liquids or mixtures of said treating liquids and of water-absorbing liquids in treating compartments, which liquids are used to remove water from the surfaces of objects to be immersed in the treating liquids, said objects being made of glass, ceramic, nickel, copper, stainless steel or synthetic resin such as, for example, disc-shaped information carriers, characterized in that the surfaces of the treating liquids in the compartments are kept at such a temperature that a similar, vaporized treating liquid which is provided over said surfaces condenses on said surfaces.

2. A method as claimed in claim 1, characterized in that the vaporous treating liquid which condenses on the surfaces is vaporized by heating in a vaporization compartment.

3. A method as claimed in claim 1, characterized in that a mixture of a fluorocarbon and an alcohol is used as a treating liquid.

4. A method as claimed in claim 1, characterized in that the treating liquids in the treating compartments are kept at a temperature below their vaporization temperature.

5. A method as claimed in claim 3, characterized in that the mixture of fluorocarbon and alcohol in the treating compartment is kept at a temperature which is from 7° to 15° C. below the boiling point of the mixture.

6. A method as claimed in claim 2, characterized in that the fluid fluorocarbon-alcohol mixture in the vaporization compartment, which is to be vaporized by heating, has such an alcohol concentration that the vaporous treating liquids and the treating liquids which are in the treating compartments are azeotropic or of a similar composition.

7. A method as claimed in claim 1, characterized in that water and/or water-contaminated treating liquid are/is led from the surfaces of the treating liquid in the treating compartments to at least one water separator by means of overflow devices, after which they/it are-/is supplied to a storage tank from where they/it are/is pumped through a filter and vaporized in the vaporization compartment.

8. A method as claimed in claim 1, characterized in that the vaporized treating liquid is also used to rinse the condensate off an object lifted from a treating compartment.

9. A method as claimed in claim 1, characterized in that the vaporized treating liquid is contained in a bounded space which comprises a cold trap from where the condensed, water-contaminated treating liquid is supplied to a water separator and then passed on to at least one treating compartment.

10. A method as claimed in claim 7, characterized in that the treating liquid is cooled in the water separator(s), thereby obtaining the desired temperatures of the treating liquids in the treating compartments.

11. A method as claimed in claim 9, characterized in that the treating liquid is cooled in the water separator, thereby obtaining the desired temperatures of the treating liquids in the treating compartments.

12. A method of replenishing and/or providing water-displacing treating liquids or mixtures of said treating liquids and of water-absorbing liquids in treating compartments, which liquids are used to remove water from the surfaces of objects to be immersed in the treating liquids, characterized in that the surfaces of the treating liquids in the compartments are kept at such a temperature that a similar, vaporized treating liquid which is provided over said surface of the treating liquids condenses on said surfaces.

* * * * *